Oct. 5, 1937. J. BRANGS Re. 20,525
METHOD OF MANUFACTURING SCISSORS, AND SCISSORS
Original Filed Dec. 7, 1931
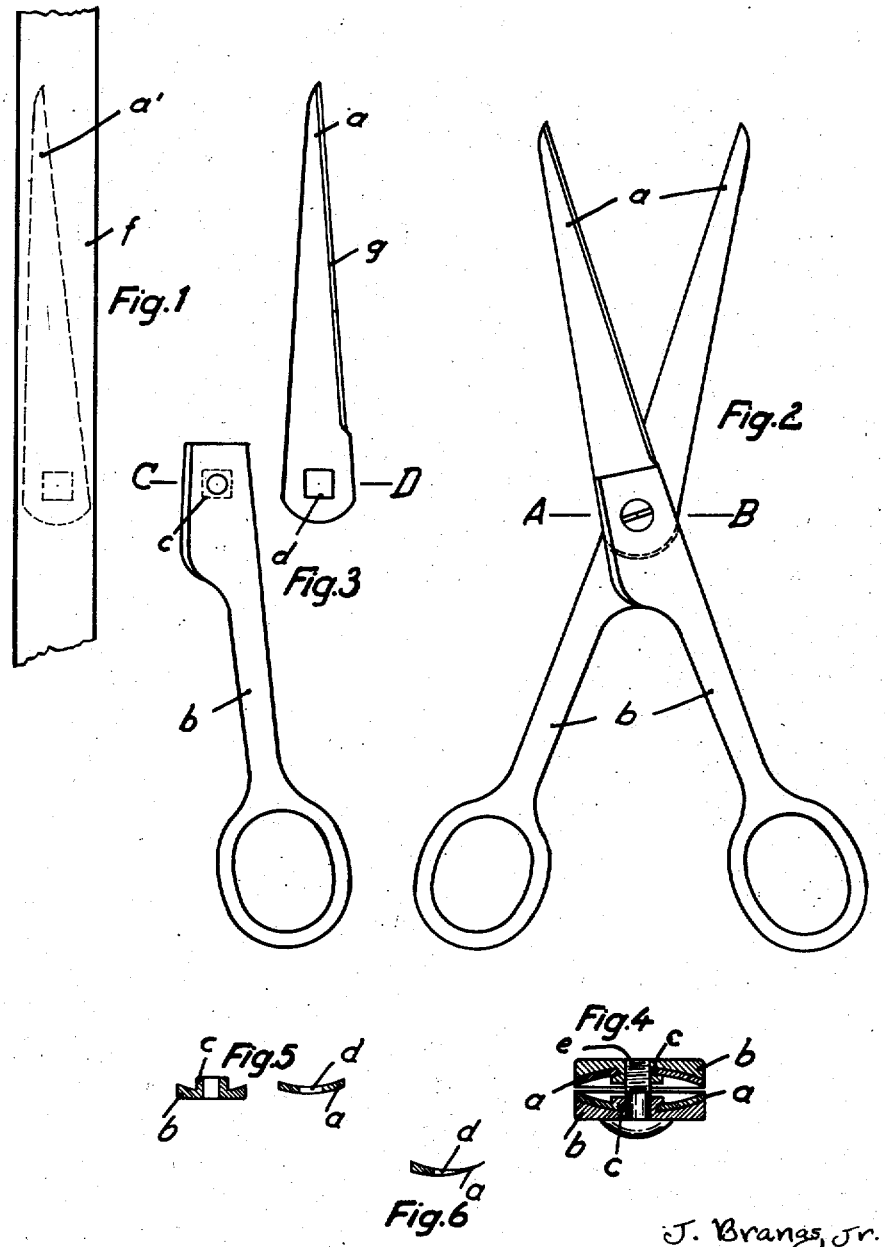
J. Brangs, Jr.
INVENTOR
By: Marks & Clerk
Attys.

Reissued Oct. 5, 1937

Re. 20,525

UNITED STATES PATENT OFFICE 20,525

METHOD OF MANUFACTURING SCISSORS, AND SCISSORS

Julius Brangs, Solingen, Germany

Original No. 1,942,324, dated January 2, 1934, Serial No. 579,534, December 7, 1931. In Germany August 13, 1930. Application for reissue December 31, 1935, Serial No. 56,998

4 Claims. (Cl. 76—104)

This invention relates to an improved method for the manufacture of scissors and to the scissors themselves that have been manufactured according to this method. More especially, the invention relates to scissors composed of separate handle legs and of separate cutting legs affixed to said handle legs. The manufacture of scissors in which each handle leg is integral with the appertaining cutting leg necessitates a considerable number of working phases which have already been reduced by manufacturing the handle leg and the cutting leg separately, especially from hollow-pressed steel, for the cutting leg, this latter being stamped out of unhardened sheet steel, and the legs being then shaped, hardened, ground and polished. But this manufacturing procedure is still circumstantial and suffers, besides, from the drawback that the thin legs are subject to warping during the hardening step, so that much waste arises. If the scissors are to cut in the proper manner, it is, however, necessary that their cutting legs and edges be straight.

The present improved method consists therein that sheet steel or band steel is first rolled out to the thickness of the finished blade portion or cutting legs, thereafter hardened in the usual manner and ultimately used for producing cutting legs for scissors by a stamping operation. Such cutting legs, due to their being properly hardened, will not require and, in fact, not permit any substantial change of shape after stamping, but for the same reason they will be found to be of a very high quality not obtainable by using sheet steel not properly hardened, and are practically ready to be attached to handle legs and assembled into scissors.

The steel band may be made hollow either before the stamping operation or simultaneously therewith or thereafter, the stiffness of the legs being in each case increased by the transversely concave shape thus obtained. The cutting members may be made hollow; a specific modification of carrying out my method consists in using steel bands which are so rolled out that one of the two longitudinal edges is thicker than the other, whereas this latter is thin and sharp, this edge constituting, after the stamping operation, the edge of the cutting leg.

It has been found that, if suitable tools are used for carrying out this method, cutting legs for all sizes of scissors can be manufactured very successfully in a highly satisfactory manner, these cutting legs answering all requirements to scissors of first-class quality.

The cutting legs may be secured to separately produced handle legs in any desired manner, for instance by means of screws or rivets, or by soldering and the like. The most important advantage achieved by producing the cutting legs in the manner as stated resides therein that any subsequent hardening operation is rendered unnecessary, so that any danger of warping of the cutting legs is obviated. Furthermore if bright material is used no subsequent polishing operation is required. The grinding or sharpening operation otherwise necessary can be restricted to a superficial grinding or sharpening of the cutting edges, because the cutting edges are very accurate from the beginning if suitable stamping tools are employed.

With the aid of the present improved method especially important advantages are obtained in the case of mass production.

In order to make my invention more clear, I refer to the accompanying drawing in which my invention is illustrated diagrammatically and by way of example, and in which Figure 1 shows a piece of band steel, out of which the cutting legs are to be stamped. Figure 2 is a view of a complete pair of scissors according to this invention. Figure 3 is a view of the two legs forming one half of the pair of scissors. Figure 4 is a transverse section along A—B in Figure 2. Figure 5 is a transverse section along C—D in Fig. 3, and Figure 6 is a transverse section through a cutting leg having a sharpened profile.

The scissors are produced as follows:

The handle legs *b* may be made in any known and desired manner, for instance by casting in moulds or by pressing or forging in swages. For the cutting legs *a* I prefer however to make use of sheet-steel, in a bright state, or more particularly of thin steel bands, as *f* in Fig. 1. The cutting legs are stamped out of this band; as indicated by the dotted line *a'*. The leg *a* (Fig. 3) is then pressed or bent hollow in its longitudinal direction, i. e., from the tip to the opposite end, as shown in Fig. 5. I wish it, however, to be understood that the pressing procedure may also be carried out before the stamping operation, i. e., not the stamped leg, but the steel band is pressed, but the pressing operation may also be performed simultaneously with the stamping operation, a procedure which I prefer. The stamping-out of the cutting leg may also be stamped out so that one of the edges of the leg coincides with one of the edges of the band.

The inner side of the portion of handle legs *b* to be connected with the cutting legs is hollow and a square or suitably shaped projection *c* projects therefrom. If the handle legs are cast or welded, said projections each have a boring and the connecting member or pivot of the scissors e. g. a screw *e* (Fig. 4) is introduced into the oppositely located bores in the said projections, one of the bores being, of course, screw-threaded. Instead of a screw a rivet may be used as a pivot and connecting member. Each cutting leg is provided with a suitably shaped opening *d* (Figs. 3 and 5) fitting over the appertaining projection *c*.

Although the material of the cutting legs is rather thin, the legs are sufficiently rigid and they are not liable to any change of shape by any subsequent operation as they are made of steel which has already been hardened. The cutting edge which has been rendered sharp already in the stamping operation requires only a superficial treatment at the grindstone.

Another modification of my process consists therein that the steelband *f* is rolled out between specially profiled rollers in such a manner that it is thicker at one edge than at the other edge. When cutting members are stamped out of such a band, the edge *a* will be nearly as sharp as required and not more than a slight subsequent regrinding will be needed.

I claim:

1. Scissors having hand legs and cutting blades in separable parts, the cutting blades consisting of hardened sheet steel and being concave on their meeting surfaces and having holes therethrough, the hand legs having integral hollow lugs extending through said holes into the space between the concave surfaces of the cutting blades and a pivot extending through the lugs.

2. A method of manufacturing scissors composed of separable half portions, each including a handle leg and cutting member, which consists in forming both the handle legs with concave end portions and with integral hollow pivot lugs in said concave portions, separately forming both cutting members from a steel band having a sharp edge, and with holes in the ends of the cutting members to fit the hollow lugs of the leg members, uniting the blades to the handle legs, and thereafter passing a pivot through the lugs whereby the concave surfaces of two cutting members when so united will accommodate said pivot lugs.

3. The method of manufacturing scissors composed of separable handle legs and cutting members, which consists in forming the cutting members from band steel having the proper thickness from its outer edge to its cutting edge and shaping the cutting members each to have an inside concave surface, and stamping a hole therein, shaping the pivot end of each handle leg to fit the outer end surface of the cutting member, forming integral hollow pivot lugs on each handle leg to fit the hole in the concave portion of each cutting member, uniting the blades to the handle legs, and thereafter passing a pivot through the lugs whereby when the lug on a handle member is passed through its hole in the cutting member the concave portion of the latter will accommodate the lug when the scissors pivots are passed through said lugs.

4. Scissors having handle legs and cutting blades in separable parts each leg being connected to a blade, the cutting blades being concave longitudinally thereof on their inner meeting surfaces and having holes therethrough, the handle legs having integral hollow lugs extending through said holes into the space between the concave surfaces of the cutting blades and a pivot extending through the lugs.

JULIUS BRANGS.